United States Patent
Ricart et al.

(10) Patent No.: US 7,356,734 B2
(45) Date of Patent: *Apr. 8, 2008

(54) METHOD AND APPARATUS FOR CREATING A BACKUP OF DATA OF FROM MULTIPLE SOURCES

(75) Inventors: Glenn Ricart, Salt Lake City, UT (US); Marc Epstein, Los Gatos, CA (US); Sheldon Laube, Los Altos Hills, CA (US)

(73) Assignee: CenterBeam, Inc., San Jose, CA (US)

( * ) Notice: Subject to any disclaimer, the term of this patent is extended or adjusted under 35 U.S.C. 154(b) by 369 days.

This patent is subject to a terminal disclaimer.

(21) Appl. No.: 11/024,337

(22) Filed: Dec. 28, 2004

(65) Prior Publication Data
US 2005/0144518 A1    Jun. 30, 2005

Related U.S. Application Data

(63) Continuation of application No. 09/772,337, filed on Jan. 29, 2001, now Pat. No. 6,892,221.

(60) Provisional application No. 60/205,727, filed on May 19, 2000.

(51) Int. Cl.
*G06F 12/16*    (2006.01)

(52) U.S. Cl. ............................... 714/20; 714/15; 714/6; 714/5; 711/162

(58) Field of Classification Search .................. None
See application file for complete search history.

(56) References Cited

U.S. PATENT DOCUMENTS

| | | |
|---|---|---|
| 5,455,932 A | 10/1995 | Major et al. |
| 5,537,533 A | 7/1996 | Staheli et al. |
| 5,774,667 A | 6/1998 | Garvey et al. |
| 5,835,953 A | 11/1998 | Ohran |
| 5,974,563 A | 10/1999 | Beeler, Jr. |
| 6,026,414 A | 2/2000 | Anglin |
| 6,526,418 B1 | 2/2003 | Midgle et al. |
| 6,615,225 B1 | 9/2003 | Cannon et al. |
| 2002/0129047 A1 | 9/2002 | Cane et al. |

*Primary Examiner*—B. James Peikari
(74) *Attorney, Agent, or Firm*—Kaplan Gilman Gibson & Dernier LLP

(57) ABSTRACT

A method and apparatus for data backup is disclosed in which prior to actually performing a backup operation from a subscriber computer, the backup server device checks a specified server to determine if parts of the subscriber data to be backed up can be backed up or replicated from data on the specified server. If it can, the backup server uses that specified server to create a backup of the subscriber data to be backed up. If it cannot, then the data is backed up from the subscriber computer.

4 Claims, 2 Drawing Sheets

METHOD AND APPARATUS FOR CREATING A BACKUP OF DATA OF FROM MULTIPLE SOURCES

RELATED APPLICATIONS

This application is a continuation of patent application Ser. No. 09/772,337 filed on Jan. 29, 2001, now U.S. Pat. No. 6,892,221, which claims the priority to Provisional Application No. 60/205,727 which was filed on May 19, 2000. The entirety of both the previous applications is incorporated here by reference.

BACKGROUND OF THE INVENTION

1. Technical Field

The present invention relates generally to data storage, and more particularly, to methods, articles, signals, and systems for efficiently backing up data.

2. Related Art

Various types of data backup are conventionally known, including tools and techniques such as: manually copying data to an Iomega® Zip® drive, a tape drive, or a floppy drive; copying data from a workstation over a local area network ("LAN"); connection to a server on that LAN; and remote data mirroring. For example, the following U.S. Patents each deal in some way with the problem of backing up data: U.S. Pat. No. 5,455,932 for a Fault Tolerant Computer System; U.S. Pat. No. 5,537,533 for a System and Method for Remote Mirroring of Digital Data from a Primary Network Server to a Remote Network Server; and U.S. Pat. No. 5,835,953 for a Backup System That Takes a Snapshot of the Locations in a Mass Storage Device That Has Been Identified for Updating Prior to Updating.

It is also known to keep a copy of data in a cache, so that later requests for the data can be serviced more rapidly than if the data were not cached. In particular and without limitation, it is well known to cache web pages and the graphics files or other files referenced by the cached pages, so that subsequent requests for those web pages and their associated files can be serviced more rapidly. Among other places, such web server caches may be located on the web server of an Internet Service Provider ("ISP"). ISPs provide individuals and/or businesses with access to the Internet and its enormous collection of web pages and other data. Many ISPs also provide access to File Transfer Protocol ("FTP") directories, provide email facilities, and otherwise provide various services that rely on transfers of digital data across the Internet and/or another Wide Area Network ("WAN").

SUMMARY OF THE INVENTION

In a first aspect of the invention is provided a method for data backup, comprising the steps of: identifying at least one data increment which was previously provided to a subscriber server or generated by a subscriber server and which is to be backed up; checking at least one service provider access server to determine if it has a copy of at least a portion of the identified data increment or can regenerate or replicate at least a portion of the identified data increment; and backing up the data increment using the copy or regenerated or replicated portion from the access server if it is found and otherwise using a copy sent from the subscriber server after the checking step. This aspect may also include a configured storage medium embodying data and instructions readable by a computer to perform the above method.

In a second aspect of the invention is provided a system comprising an access server at an ISP, a data backup server at the ISP, and a connection to a subscriber server for Internet access and for data backup.

In a third aspect of the invention is provided a signal embodied in a computer, the signal comprising at least one data increment identifier identifying data to backup to non-volatile storage, and a corresponding indication of whether a copy of that data increment was found on a provider access server.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein.

DESCRIPTION OF THE PREFERRED EMBODIMENTS

Figure 1:
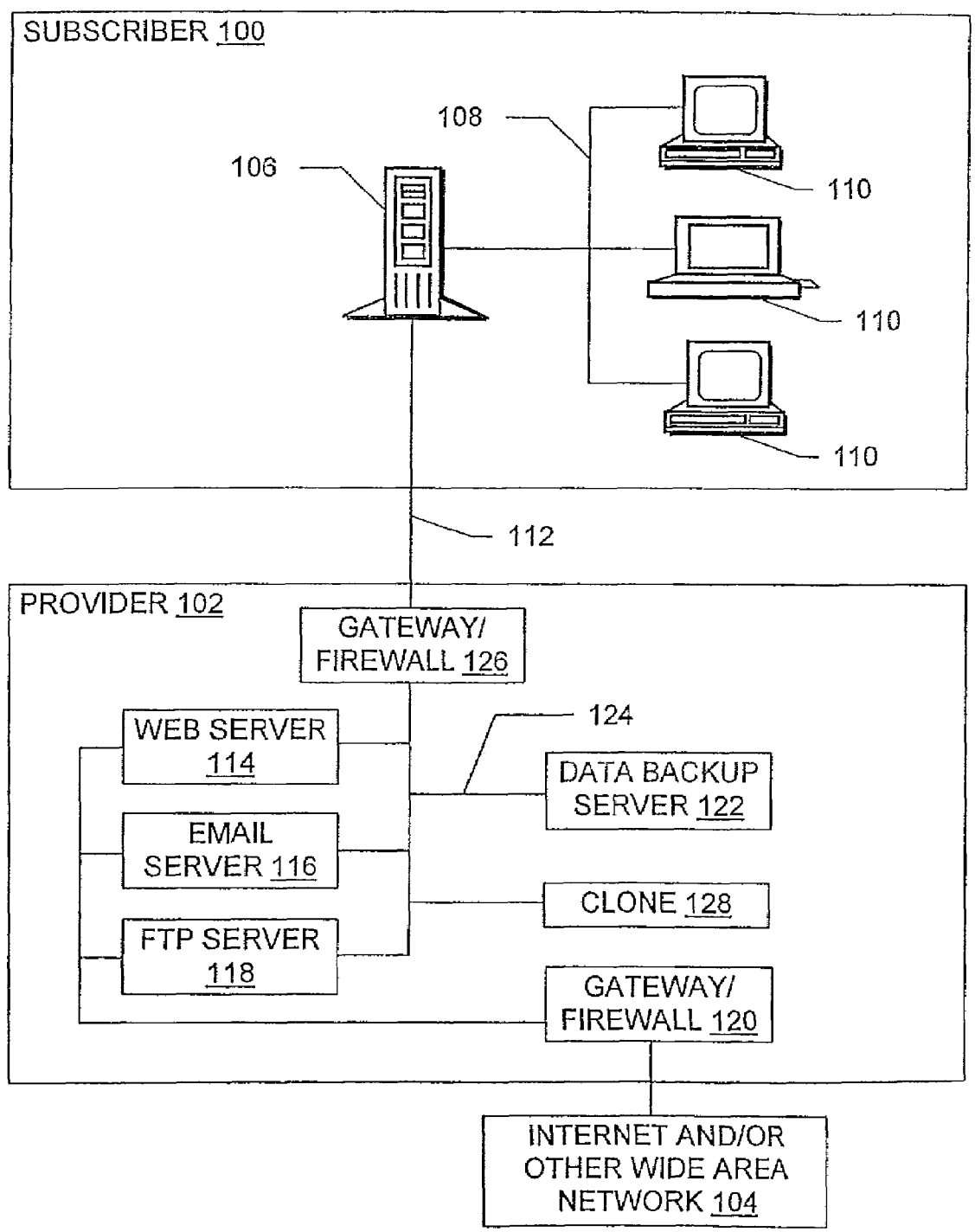
FIG. 1 shows subscriber-provider environment in accordance with the invention.

The present invention relates to methods, articles, signals, and systems for efficiently backing up data in an architecture such as the one illustrated in FIG. 1. A subscriber 100 subscribes to services provided by a provider 102. These services include not only Internet 104 access services like those provided by conventional ISPs, but also data backup services. The illustrated subscriber 100 has a computing infrastructure that includes a LAN server 106 connected by wireless or other network connections 108 to one or more workstations 110. Suitable network clients 110 and individual computers include, without limitation, personal computers, laptops, and dumb terminals. The network 108 signal lines may include twisted pair, coaxial, or optical fiber cables, telephone lines, satellites, microwave relays, modulated AC power lines, infrared, RF or other wireless connections, and other data transmission "wires" known to those of skill in the art. Signals according to the invention may be embodied in such "wires" and/or in addressable storage media such as the server 106 disk or RAM.

The subscriber server 106 is connected to the provider 102 by a digital subscriber line (DSL) or other data communications link 112. The provider 102 uses various access servers to provide the subscriber 100 with access services over the link 112. For instance, the illustrated provider 102 has access servers that include a web server 114, an email server 116, and an FTP server 118. Other providers 102 may have more, fewer, and/or different access servers. The servers 106, 114-118 may be uniprocessor or multiprocessor machines, and/or may include a tightly coupled cluster of machines. The servers 106, 114-118 may have storage in the form of internal disks, external disks, and/or Redundant Array of Independent Disks ("RAID") units.

The provider 102 can include, for instance, an Internet Service Provider (ISP); a corporate IS department; one or more departmental server(s); one or more residential access gateway(s) or server(s); one or more small or medium size business gateway or server(s); one or more aggregation and service points for a "smart" house, networked automobile, network airplane, and so on; an application service provider (ASP); a network and desktop outsourcing service (NDOS); a commercial building main distribution room (MDF) and/or server(s) shared by tenants; a co-location provider ("co-lo" facility); a server installed at an aggregation point in a network specifically to implement the present invention; and/or a fixed or anchor machine(s) to which a person refers using smaller, possibly wireless, access devices.

On behalf of one or more network clients 110 and/or the subscriber server 106, data is transferred between the subscriber server 106 and the various access servers (e.g., servers 114, 116, 118), through zero or more gateways and/or firewalls such as those identified as components 120, 126, and the Internet 104 and/or other site(s) with which the provider site 102 communicates. For instance, a workstation 110 may request a particular web page, causing the web page's data to travel from the Internet 104 through the gateway 120 to the web server 114, from there through a possible firewall or gateway 126 to the LAN server 106, and finally to the workstation 110. Likewise, an email message (possibly with one or more attached files) may be sent from a laptop 110 to the LAN server 106, from there through a possible gateway 126 to the email server 116, and then out the gateway 120 to the Internet 104 for subsequent delivery to some other email-capable computing device at another location, which may or may not be a subscriber 100 location. Gateways and firewalls 120, 126 are for illustration only; some embodiments have more, fewer, or different gateways, firewalls, bridges, routers, etc. than shown.

In either case, as in other cases of data transfer aided by the provider's access servers, a copy of the data may be cached by access server software. For instance, the web server 114 may retain a copy of the requested web page for some time. The retention period for a given copy of data may be predetermined, or it may vary according to access server storage capacity, data origin, and/or other factors. Likewise, the email server 116 may retain a copy of email messages and possibly their attachments in its own message store, in a cache, in a recovery log, or in another type of log. If servers 114, 116, or 118 are keeping a copy of data, then that data doesn't need to be copied from the subscriber to be backed up at the provider.

More generally, the present invention takes advantage of the fact that some data at subscriber 100 may have been generated in a replicable way by provider servers or may have passed through the provider 102 and been copied before being delivered to a subscriber machine 106 and/or 110. A data backup server 122 can backup such information without requesting that a copy be re-sent over link 112, as it would be under other approaches. Instead, the backup server 122 asks for the information to be regenerated or to be retrieved from a provider server, or notes that it has previously copied it when it passed through the provider. Similarly, information which is generated and kept at subscriber 100 may be copied to backup server 122 or another provider server in connection with the task of sending the information to the provider 102, to the Internet, or to another site 104, in the normal course of events which are conventionally unrelated to backing up the information. In this way, it is not necessary for a separate copy of the information to be sent over link 112 to do a backup, as would be required under other approaches.

A data backup server 122 checks the provider's servers for subscriber 100 data which has been identified as data that needs to be backed up. If the data is found on a server at provider 102, it travels over the relatively high speed and/or low cost provider network 124 to backup storage, instead of traveling over the relatively low speed and/or higher cost subscriber-provider link 112. This is advantageous even if the subscriber-provider link 112 does not have substantially greater latency than the provider LAN 124, because sending data over the subscriber-provider link 112 to be backed up at the provider 102 requires link 112 bandwidth that might be better used for promptly servicing subscriber 100 access requests. The network 124 is not necessarily a LAN, but may well be a LAN in many embodiments.

The data backup server 122 is shown separately from the access servers 114-118, but in some embodiments may be implemented as a separate process on the same computer that runs one or more of the access servers 114, 116, 118, or it may be a combined function in such a server. The data backup server 122 is capable of using one or more magnetic disk drives, floppy drives, tape drives, optical drives, or other means to read a configured storage medium. A suitably configured storage medium includes a magnetic, optical, or other computer-readable storage device having a specific physical substrate configuration. Suitable storage devices include floppy disks, Iomega® Zip® disks, hard disks, tapes, CD-ROMs, PROMs, RAM and other computer system storage devices. The substrate configuration represents data and instructions which cause the computer system to operate in a specific and predefined manner as described herein. Thus, the medium tangibly embodies a program, functions, and/or instructions that are executable by at least the data backup server 122 (and possibly in part also by the access servers and/or subscriber server 106 and/or clients 110) to perform data increment identification and data backup steps of the present invention substantially as described herein.

Figure 2:
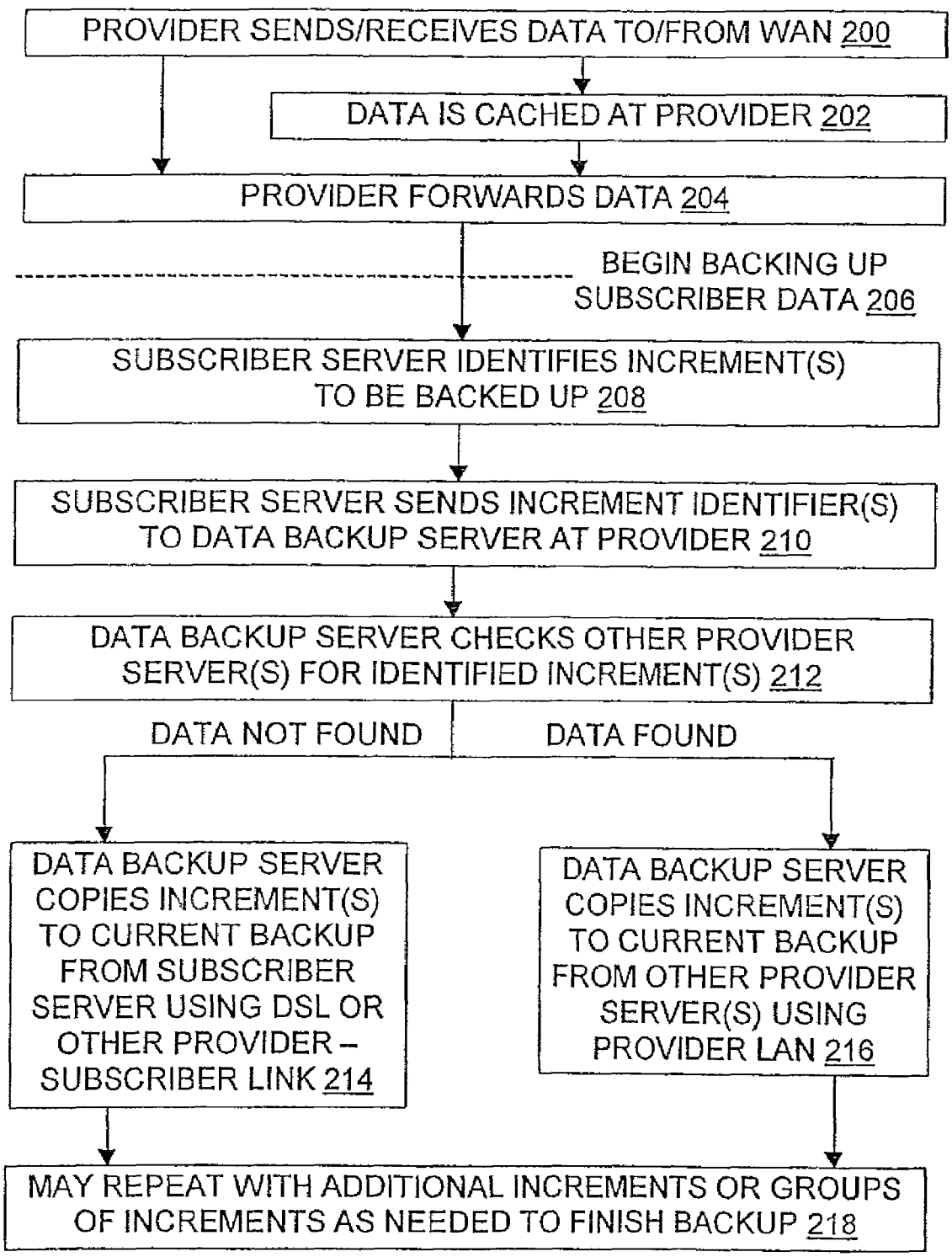
FIG. 2 shows a flowchart of a process of backing up data in accordance with the invention.

The invention is further illustrated in FIG. 2. As discussed, the provider 102 sends and receives 200 data to and from the Internet/WAN 104 on behalf of the subscriber 100. Sometimes part or all of the data in a given transmission is cached 202 at the provider 102 in one or more of the access servers (e.g., the email server 116 or the web server 114), and sometimes the data is not cached. Although it does not rule them out and may benefit from them, the present invention also does not require any change to existing policies and capabilities for caching data. Rather, during backup services provided by the provider 102 in its role as data protector, the invention takes advantage of caching that was done by the provider 102 in its role as ISP.

Regardless of whether a particular instance of data is cached, the provider 102 forwards 204 the received data to the subscriber server 106, or to the gateway 120, depending on the data's direction of travel. These steps 200-204 may occur more than once before a backup is initiated. For instance, the subscriber's data may be backed up by the provider 102 at a specified time each night.

During the backup process, the subscriber server 106 and/or subscriber LAN clients 110 identify 208 one or more data increments to be backed up. The increment granularity may vary; examples of possible increments include files, web pages, web pages with their referenced graphic files, directories, portions of files, and database portions. Conventional tools and techniques may be used to identify 208 the increments, including without limitation date stamps, timestamps, sequence numbers, source addresses, URLs, and checksums.

The subscriber server 106 then sends 210 increment identifiers over the link 112 to the data backup server 122. Suitable increment identifiers depend in part on the granularity of the increments. For a file, for instance, the combination of file name, last modification date, and file size in bytes would be one suitable identifier if files are increments. The increment identifiers are specific enough to permit the data backup server 122 to query 212 the provider 102 access servers to identify candidate matching increments that are already at the provider 102. If any candidates are found, checksums; can be computed and compared to determine if the candidates actually contain the same data as the subscriber's increments. In an alternative embodiment, the identifiers are specific enough to permit the data backup server 122 to query 212 the provider 102 access servers to identify exactly matching increments immediately, without requesting additional information from the subscriber server 106.

If matching increment data is not found, then the data backup server 122 backs up the identified increment by copying 214 the increment's data over the link 112 to nonvolatile storage at the provider 112. Alternately, the increment may be identified in a queue, to be collected and backed up later. Data which is queued for later collection may be specifically listened for by provider servers, by gateways, and/or by firewalls, such as the servers 114, 116, 118, the gateway/firewall 120, and the gateway/firewall 126.

However, if matching increment data is found, then the data backup server 122 backs up the identified increment by copying 216 its data over the provider LAN 124, thereby leaving the link 112 free to service access requests and/or free for the transfer of other data during an instance of step 214.

The steps 208-216 may be repeated 218, in various combinations, with additional data increments or groups of data increments, as needed to complete the backup started at point 206. FIG. 2 is not comprehensive. For instance, other inventive methods discussed herein check for regeneration of data and/or collect copies of data that may need to be backed up later. Of course, the present invention may also be used with other backup methods, including the conventional methods identified at the beginning of this document.

Note that being "at" the provider does not necessarily mean being in the same room or even in the same building as other illustrated components. It simply means being at a location that is reached over a link 112 from the subscriber and controlled by the provider entity. One alternate embodiment sends backup data over a second link 112 while the subscriber 100 continues to have access to the first link 112 for access services. The second link 112 may lead to the same physical facility as the first link 112, or it may lead to a separate facility of the provider 102.

The steps, server(s), and other components of the invention illustrated in FIGS. 1 and 2 may use checksums and other conventional tools and techniques. This includes without limitation the tools and techniques described in connection with the sync algorithm.

Thus, any data that is generated by or passes through the provider 102 can be backed up if it is remembered or otherwise replicable in some manner. Sometimes a copy of the data is kept serendipitously, such as when a web cache happens to have remembered a web page by caching a copy of it. Sometimes the data may be kept on purpose to aid backups, as when the provider 102 notes that a protocol such as FTP is being used to download a file from the Internet and the provider software "guesses" that the file might need to be backed up later.

In a suitable embodiment the present invention can automatically backup anything originating at the provider 102. For example, in a given embodiment such data may include a copy of a user's current calendar (which is being kept by a calendar server), a copy of provider-delivered software or data from FTP server 118, lists of other users of the provider's system, or lists of users affiliated with the requesting user.

Alternatively, or in addition, the present invention can automatically backup anything kept by the provider 102, as discussed above in connection with FIG. 1, for instance. Of course, a file retrieved from the backup server 122 does not need to be backed up again to the backup server; this is apparently recognized, for instance, in tools commercially provided by Connected, Inc.

Alternatively, or in addition, an embodiment of the present invention can automatically backup anything passing through the provider 102. The data backup server 122 and/or processes in other server computers at the provider 102 may be programmed to selectively or comprehensively keep copies of information flowing over the link 112 toward the subscriber 100 that may need to be backed up later. Then the copy can be backed up instead of transferring new information over the link 112.

For example, if a subscriber uses FTP to retrieve a file from the Internet, the provider 102 may have the information copied to the backup server 122 at the same time (or shortly before or after) it is delivered to the subscriber 100 over link 112. Then, if the file later needs to be backed up, a copy is already present at the backup server 122.

One can collect data passing through by the use of an intelligent gateway/firewall 120 which makes copies of data matching specified parameters, such as the protocol used (e.g., FTP) or the size of the data. Alternately, one may capture copies of specified data to a backup server. This could be done, for instance, by the use of a "promiscuous mode" server that watches data pass over LAN 124, or by an intelligent outer/gateway/firewall 126 located between the provider 102 and the link 112, which make copies of certain data or send copies of certain data to a backup server.

Alternatively, or in addition, the present invention can be used to automatically backup anything sent by the subscriber 100 to the provider 102 or sent through the provider 102 to another site or to the Internet 104. Using the mechanisms described here, information originating from the subscriber 100 is kept at the provider 102 so that the same information does not have to be transmitted over link 112 later merely to be backed up.

Note that in any of these cases, some copies of information may be kept in the normal course of events (e.g., in a web cache, or by an email server), whereas some information may be kept because the provider's servers guess that the information might be needed later for backup. When an increment is not found at the provider 102, it doesn't necessary have to be retrieved from the subscriber 100. It might be re-generated by the servers at the provider 102. If it came from the subscriber 100 or from the Internet 104, the provider 102 can be "on the lookout" for the increment to pass through the provider in the normal course of events. If the missing increment later appears on LAN 124, it is backed up at that time as well as used in performing the other function for which it appeared on LAN 124. That is, lists of missing increments may be queued, after which the provider 102 waits to see if the missing increment appears on LAN 124 some time later in the course of events such as web page retrieval, email transmission, file transfers, and so on. Only as a last resort will the increment be requested over link 112 merely for the purpose of permitting it to be backed up.

In conclusion, data to be backed up may be at the provider 102 for various reasons. A provider server 114 or 116 may have generated the data initially and may also be able to re-generate or replicate it again when the time comes to backup the data. Alternatively, the data to be backed up may have been initially stored at the provider 102, e.g. in FTP server 118 and downloaded to the subscriber 100. The data may have been initially generated or stored at the subscriber 100 and then stored at the provider 102 (e.g. in FTP server 118) by the subscriber 100. A copy of the data may be kept in the normal course of events regardless of the backup function (e.g. in a web cache or email store) by a server such as web server 114 or email server 116. Or the data may have been kept in a provider server 114, 116, 118, or 122 specifically to save backup time, e.g., keep a copy of a file downloaded from the Internet.

The provider 102 may collect pass-through data in various ways. This may be done by operation of an interposing server such as a web cache; by duplicating data at a gateway/router/firewall (e.g., one or more of components 120, 126) and sending the duplicate data to-a backup store; and/or by sniffing the network 124 in "promiscuous mode".

When it comes time to actually back up the data increment, the increment may be re-generated or regurgitated by a provider machine 114, 116, or 118. A server 114, 116, or 118 may have kept a copy of the increment when the increment passed through earlier. The increment may also have been pre-stored by the data backup server 122 when it passed through provider 102.

The increment may have originated from an outside network 104, or from another location operated by the provider 102, or from an associated or related network of the provider or one of its partners or customers. The increment may also have originated at the subscriber 100, or at a provider server 114, 116, 118, or 122.

When an increment is to be backed up, in some cases it can be found at the provider 102 already. For instance, it may be pre-stored in the backup machine 122, or it may be copied to the backup machine 122 from a server machine 114, 116, or 118. It may also be data which is already stored on a provider server 114, 116, or 118, and doesn't need to be copied to the backup server 122 because the provider server 114, 116, or 118 will continue to keep a copy. In this after case, if a server 114, 116, or 118 later needs to delete a copy, it might signal the backup server 122 so that it can make a copy at the backup server 122 or determine that no backup is still needed. In some cases, the increment to be backed up is not found at the provider already, but the provider servers and other components can watch for the increment to pass through the provider in the future in the normal course of events, and at that time the increment will be captured for backup. As a last resort, the increment can be sent over link 112 just for the purpose of backup.

The backup server function may be implemented in a separate machine, as illustrated by server 122. However, the backup server function may also be implemented as a separate process in other server(s) 114, 116, or 118, or it may be an integrated function of some or all functional servers 114, 116, or 118. For example, the email machine may also be responsible for the backup of all email messages found at the subscriber 100.

Note that backup to storage is not the only purpose for which the present invention may be used. For example, the invention may be used to keep up-to-date a clone 128 of a workstation 110 or subscriber server 106 located at the service provider 102. In case of a failure or overuse of a subscriber server 106 or workstation 110, the clone 128 could be shipped to the customer 100 to replace the failed equipment and/or it could be used to add capacity, without taking time to restore information from a backup device. Alternatively, the clone 128 could be operated at the service provider's location to provide substitute or additional service to the subscriber 100.

As another example, consider a person who has a fixed anchor machine (a single machine in place of provider 102) and uses a wireless handheld or other roving device. Examples of wireless handheld devices include the Palm VII® device and Research in Motion's Blackberry device. Roving devices include these, as well as other existing or future classes of specialized and/or portable and/or wireless devices. Communications to the smaller and/or specialized and/or portable and/or wireless roving device pass through the anchor computer. Contents of the roving device can be efficiently backed up (in case the roving device is lost, stolen, malfunctions, or needs to be duplicated) using the present invention. That is, the anchor machine takes the role of the provider 102, and the roving device takes the role of the subscriber 100. This embodiment of the invention can be particularly valuable if the roving device is a wireless device that uses a slow and/or expensive communications mechanism to communicate with the anchor computer.

Although particular systems and methods embodying the present invention are expressly illustrated and described herein, it will be appreciated that apparatus, signal, and article embodiments may also be formed according the present invention. Unless otherwise expressly indicated, the description herein of any type of embodiment of the present invention therefore extends to other types of embodiments in a manner understood by those of skill in the art.

The invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for data backup, comprising the steps of:
   receiving a request from a subscriber server for backing up at least one data increment which was previously transmitted without a separate prior backup request and operation between said subscriber server and a remote destination through a provider server;
   identifying said at least one data increment;
   checking said at least one provider server to determine if it has a copy of at least a portion of the identified data increment or can regenerate or replicate at least a portion of the identified data increment; and
   backing up the data increment using the copy or regenerated or replicated portion from the provider server if it is found;
   wherein said step of identifying said at least one data increment includes evaluating at least one of a date stamp, time stamp, sequence number, source address, URL and checksum of the data increment at the subscriber server, and sending an identifier for each identified data increment to a service provider data backup server which includes plural servers that monitor and copy data having specified properties determined to be indicative of data likely to be subject to said request from a subscriber.

2. The method of claim 1, wherein if the at least one service provider server has the copy or regenerated or replicated portion of the identified data increment, a checksum is computed to determine if the subscriber server copy contains the same data as the copy or regenerated or replicated portion.

3. The method of claim 1, wherein if a copy is sent from the subscriber server after the checking step, back up is delayed for a time period.

4. The method of claim 1, wherein the step of backing up includes backing up the data increment to a service provider data backup server.

* * * * *

UNITED STATES PATENT AND TRADEMARK OFFICE
CERTIFICATE OF CORRECTION

PATENT NO. : 7,356,734 B2  
APPLICATION NO. : 11/024337  
DATED : April 8, 2008  
INVENTOR(S) : Glenn Ricart, Marc Epstein and Sheldon Laube Page 1 of 1

It is certified that error appears in the above-identified patent and that said Letters Patent is hereby corrected as shown below:

Title page, item [54] and col. 1

In line 2 of the Title, please remove the second occurrence of the word "OF".

Signed and Sealed this

First Day of July, 2008

JON W. DUDAS  
*Director of the United States Patent and Trademark Office*